O. M. OLSEN.
SANITARY COOKING VESSEL.
APPLICATION FILED JUNE 19, 1917.

1,291,620. Patented Jan. 14, 1919.

Inventor
O. M. Olsen,
By Chandlee & Chandlee
Attorney

Witnesses
G. C. Walling
H. M. Test

UNITED STATES PATENT OFFICE.

OLAF M. OLSEN, OF BROOKLYN, NEW YORK.

SANITARY COOKING VESSEL.

1,291,620.  Specification of Letters Patent.  Patented Jan. 14, 1919.

Application filed June 19, 1917.  Serial No. 175,654.

*To all whom it may concern:*

Be it known that I, OLAF M. OLSEN, a citizen of the United States, residing at Brooklyn, in the county of Kings, State of New York, have invented certain new and useful Improvements in Sanitary Cooking Vessels; and I do hereby declare the following to be a full, clear, and exact description of the invention, such as will enable others skilled in the art to which it appertains to make and use the same.

This invention relates to improvements in cooking vessels and particularly to lids or covers therefor.

One object of the present invention is to provide a lid or cover for a cooking vessel which is capable of being used as a dish or plate when removed from the vessel.

Another object is to provide a cover which will properly fit into the vessel whereby danger of the liquid contents of the vessel boiling over and running down the side of the vessel onto the stove, is obviated.

Other objects and advantages will be apparent from the following description when taken in connection with the accompanying drawing.

Figure 1:
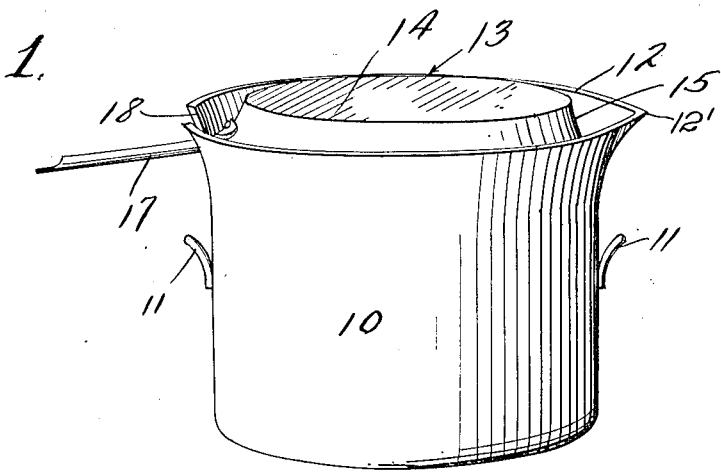
Figure 1 is a perspective view of a cooking vessel and lid made in accordance with my invention.
Figure 2:
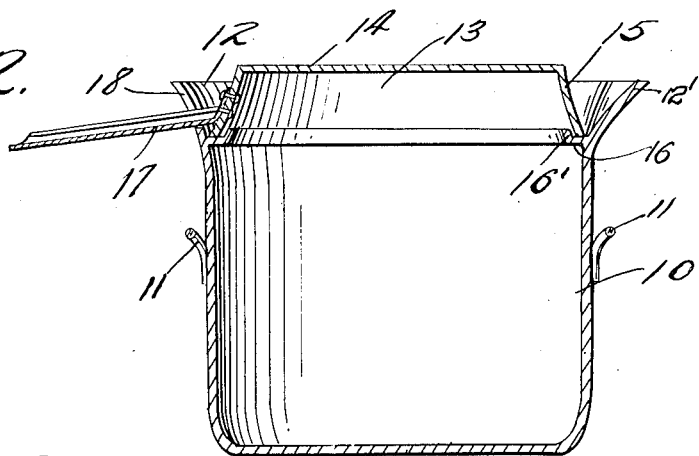
Fig. 2 is an enlarged vertical sectional view through the vessel and lid.
Figure 3:
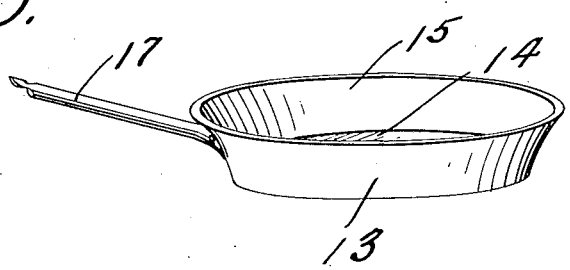
Fig. 3 is a perspective view of the lid removed from the vessel and inverted for use as a pan or plate.

Referring particularly to the accompanying drawing 10 represents the body of the cooking vessel which is provided with the handles 11 for lifting and carrying the same to and from the stove. The upper edge of the vessel is flared outwardly, as at 12, and seated within the lower portion of the flared part is the lid or cover 13. The cover is in the form of a pan having the flat top wall 14 and the surrounding outwardly and downwardly inclined wall 15, whereby when said cover or lid is removed from the vessel and inverted, it forms a convenient pan or plate which is adapted for various purposes. The bottom edge of the wall 15 is turned to extend at an acute angle to the edge of the wall and is adapted to fit snugly against the inner face of the flared portion of the vessel mouth and rest on the ledge 16 which extends horizontally inwardly from the lower end of the flared portion. The inner edge 16' of the ledge 16 is turned upwardly and is spaced from the wall 15 when the lid or cover is in place. Thus a circular gutter is produced into which condensation of steam and grease will be collected as it flows down the inner face of the wall 15, said portion being shown at 16. One side of the flange 15 has secured thereto a handle 17 which extends radially from the said edge. The flared mouth of the vessel is formed with a pouring lip 12' at one side and a notch 18 at the diametrically opposite side, in the latter of which the said handle 17 is adapted to be seated when the cover is in proper position on the vessel and within the flared mouth thereof. It will be noted that the lower edge of the cover, when seated within the mouth of the vessel, is disposed a distance below the peripheral edge thereof, and outwardly of the upturned edge of the ledge 16, thus providing a gutter which will prevent the overflowing of the contents of the vessel when it reaches the boiling point. It will also be noted that the bottom of the notch 18 is practically on a level with the upper edge of the upturned portion 16' of the ledge 16, whereby condensation of grease or steam will not overflow through said notch should any of said condensation pass beneath the flange 15 of cover, when said cover is seated on said ledge.

The upper side of the cover being flat will permit the cover, when inverted, to lie flatly on a table or stove top, whereby the cover may be conveniently used for the purpose of frying other articles of food, or may be used to receive the cooked food from the vessel.

What is claimed is:

A cooking vessel including a receptacle having an upwardly and outwardly flared mouth, said mouth being formed with a pouring lip and a notch at a point diametrically opposite to the lip, an inwardly extending ledge formed on the wall of the receptacle at the bottom of the flared portion and having its edge portion turned upwardly, and a cover in the form of an inverted frying pan disposed to seat its mouth on said ledge and outwardly of the upturned edge thereof, said cover having a handle disposed through said notch.

In testimony whereof I affix my signature in the presence of two witnesses.

OLAF M. OLSEN.

Witnesses:
  HENRY B. HASTAD,
  HANS CHRISTIANSON.